US006678808B2

(12) United States Patent
Jourdan et al.

(10) Patent No.: US 6,678,808 B2
(45) Date of Patent: *Jan. 13, 2004

(54) MEMORY RECORD UPDATE FILTERING

(75) Inventors: Stephan J. Jourdan, Portland, OR (US); Ronny Ronen, Haifa (IL); Michael Bekerman, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/384,531

(22) Filed: Mar. 11, 2003

(65) Prior Publication Data

US 2003/0140203 A1 Jul. 24, 2003

Related U.S. Application Data

(63) Continuation of application No. 10/153,920, filed on May 23, 2002, now Pat. No. 6,553,469, which is a continuation of application No. 09/475,984, filed on Dec. 30, 1999, now Pat. No. 6,412,050.

(51) Int. Cl.[7] .............................................. G06F 12/00
(52) U.S. Cl. ........................ 711/159; 711/133; 711/151
(58) Field of Search ................................ 711/159, 133, 711/151, 118

(56) References Cited

U.S. PATENT DOCUMENTS

| 4,296,279 | A | * | 10/1981 | Stork | 704/264 |
|---|---|---|---|---|---|
| 5,007,099 | A | * | 4/1991 | Matsushima et al. | 382/260 |
| 5,202,829 | A | * | 4/1993 | Geier | 701/215 |
| 5,623,695 | A | * | 4/1997 | Lozinski et al. | 710/8 |
| 5,754,759 | A | * | 5/1998 | Clarke et al. | 714/37 |
| 5,761,706 | A | * | 6/1998 | Kessler et al. | 711/118 |
| 5,798,693 | A | * | 8/1998 | Engellenner | 340/10.33 |
| 5,860,136 | A | * | 1/1999 | Fenner | 711/201 |
| 5,867,799 | A | * | 2/1999 | Lang et al. | 707/1 |
| 5,948,073 | A | * | 9/1999 | Chapin et al. | 710/1 |
| 5,954,793 | A | * | 9/1999 | Stutman et al. | 709/204 |
| 6,057,756 | A | * | 5/2000 | Engellenner | 340/505 |
| 6,108,657 | A | * | 8/2000 | Shoup et al. | 707/100 |
| 6,308,220 | B1 | * | 10/2001 | Mathur | 709/238 |
| 6,421,790 | B1 | * | 7/2002 | Fruehling et al. | 714/30 |
| 6,553,466 | B1 | * | 4/2003 | Friedman et al. | 711/152 |

OTHER PUBLICATIONS

Morancho et al, "Split Last–Address Predictor", Departament d'Arquitectura de Computadors, Universitat Politècnica de Catalunya, Barcelona, Spain, 1998 IEEE 0–8186–8591–3/98, pp. 230–237.

* cited by examiner

Primary Examiner—David Hudspeth
Assistant Examiner—Fred F. Tzeng
(74) Attorney, Agent, or Firm—Kenyon & Kenyon

(57) ABSTRACT

Apparatus and methods to filter memory record updates. A microprocessor can include a memory record update filter. The memory record update filter can include a table memory populated by a plurality of data entries. Each data entry can include a data tag field to store a data tag, a data field to store a data value, and a filter field to store a filter value. A first comparator can be in communication with the data tag field of the table memory and a data accessing information input to perform a data tag comparison. A second comparator can be in communication with the filter field of the table memory and a data value input. A control circuit can be in communication with the table memory, the first comparator, and the second comparator.

24 Claims, 2 Drawing Sheets

MEMORY RECORD UPDATE FILTERING

CROSS REFERENCE TO RELATED APPLICATIONS

This application is a continuation of application Ser. No. 10/153,920 filed May 23, 2002 now U.S. Pat. No. 6,553,469, which is a continuation of application Ser. No. 09/475,984 filed Dec. 30, 1999, which issued as U.S. Pat. No. 6,412,050, which are incorporated herein in their entirety by reference thereto.

FIELD OF THE INVENTION

Embodiments of the present invention relate to microprocessors and computers in general. More particularly, embodiments of the present invention relate to memory record updating.

BACKGROUND OF THE INVENTION

Microprocessor performance can be improved by collecting information related to the processing of instructions and storing that information in memory records, e.g., in a cache, in a buffer in memory, in an address predictor, etc. Aspects of the behavior of executed instructions can be stored in a memory record to improve performance when one or more of those instructions (and/or other related instructions) is subsequently executed.

For example, memory operands of instructions can be stored in a main memory or a cache. A cache is typically a small, fast memory that is closer to (and/or part of) a microprocessor than the larger, slower main memory. Retrieval of the operands from the cache can be significantly faster than retrieval of the operands from main memory. The amount of time required to execute an instruction can be dependent on the amount of time required to retrieve the operands of the instruction. Reduced operand retrieval times can increase microprocessor performance because instructions can be executed faster. In known systems, instructions that have been recently executed can be likely to be executed again within a certain period of time. Thus, to increase microprocessor performance, the cache can store the operands of the most recently executed instructions. When one or more of the most recently executed instructions are again executed and the necessary operands are stored in the cache, microprocessor performance can be improved due to reduced operand retrieval times.

In another example, the instruction pointer of a branch instruction and the target address of the branch instruction can be stored in an entry of a branch target buffer. An instruction pointer can be an identifier of an instruction that identifies the memory address where an instruction is stored prior to its retrieval and execution. A branch instruction of a program is an instruction that can redirect the path of execution of a program being executed by a microprocessor. In a simple example, a branch instruction can redirect the path of execution of the program based on an operand value, and the target address of the branch instruction can specify where the redirected execution is to begin (e.g., at which address the redirected execution is to begin, etc.). The target address is typically calculated at least a first time a branch instruction is executed, and target address calculation can delay execution of the branch instruction.

Storing the instruction pointer and the target address of an executed branch instruction in a branch target buffer can allow branch address prediction. When a branch instruction is fetched, the branch target buffer can be accessed to determine if a target address is stored corresponding to the instruction pointer of the branch instruction. When such a target address is stored in the branch target buffer, the target address can be used as a predicted branch address. Using predicted branch addresses can increase microprocessor performance by allowing earlier execution of addresses subsequent to the predicted branch address.

A limitation of data records that store information related to the processing of instructions—such a data caches, branch target buffers, and other event records—is that their size is usually limited (e.g., by the size of the cache, the buffer memory allocation, etc.) to a certain number of data entries. When each of the data entries of the data record are full and a new data value is received to be written to the data record, known allocation methods can decide which one of the old data values will be evicted to allow storing of the new data value.

One known allocation policy decides which data value is evicted based solely on temporal locality, e.g., based on how long a data value has been stored in the data record. For example, an allocation policy can cause the least recently used data value to be evicted from the data record so that the new data value can be stored. A temporal allocation policy can be inefficient because older, more critical data values can be evicted so that newer, non-critical data values can be stored. Older, more critical data values can include data relating to regular events that are regularly executed. At times, however, a series of non-regular events (e.g., rare events, unique events, non-typical events, etc.) can be executed. When a data record is operated according to a temporal allocation policy, the regular event data can be evicted from the data record to allow storing the non-regular event data, even though the non-regular event data will not likely be accessed again and the regular event data will likely be accessed again. Thus, after the non-regular event data has been written into the data record, subsequent execution of the regular events can be delayed because the regular event data has been evicted from the data record and must be reloaded from main memory, recalculated, etc. Replacing relevant data stored in a data record with non-relevant data has been termed "polluting" or "trashing" the data record.

In view of the foregoing, it can be appreciated that a substantial need exists for methods and apparatus which can advantageously filter memory record updating.

SUMMARY OF THE INVENTION

Embodiments of the present invention include apparatus and methods to filter memory record updating. A microprocessor can include a memory record update filter. The memory record update filter can include a table memory populated by a plurality of data entries. Each data entry can include a data tag field to store a data tag, a data field to store a data value, and a filter field to store a filter value. A first comparator can be in communication with the data tag field of the table memory and a data accessing information input to perform a data tag comparison. A second comparator can be in communication with the filter field of the table memory and a data value input. A control circuit can be in communication with the table memory, the first comparator, and the second comparator.

DETAILED DESCRIPTION

Embodiments of the present invention can filter memory record updating. A data record can be populated by a plurality of data entries, each data entry including information corresponding to a data value. A filter record can be populated by a plurality of filter entries, each filter entry including a descriptor of a data value. Potential updates to the data record can be filtered based on temporal locality (e.g., how recently a data value was used) and relevance (e.g., the likelihood of future use of a data value). In one embodiment, whether to update the data record with a new data value can be based on (1) whether the data value is stored in the data record, and/or (2) whether a descriptor of the data value is stored in the filter record. Filtering of updates to the data record can improve system performance by reducing a likelihood that irregular data values (e.g., non-related data values, irrelevant data values) will pollute a data record by evicting the regular data values.

Figure 1:
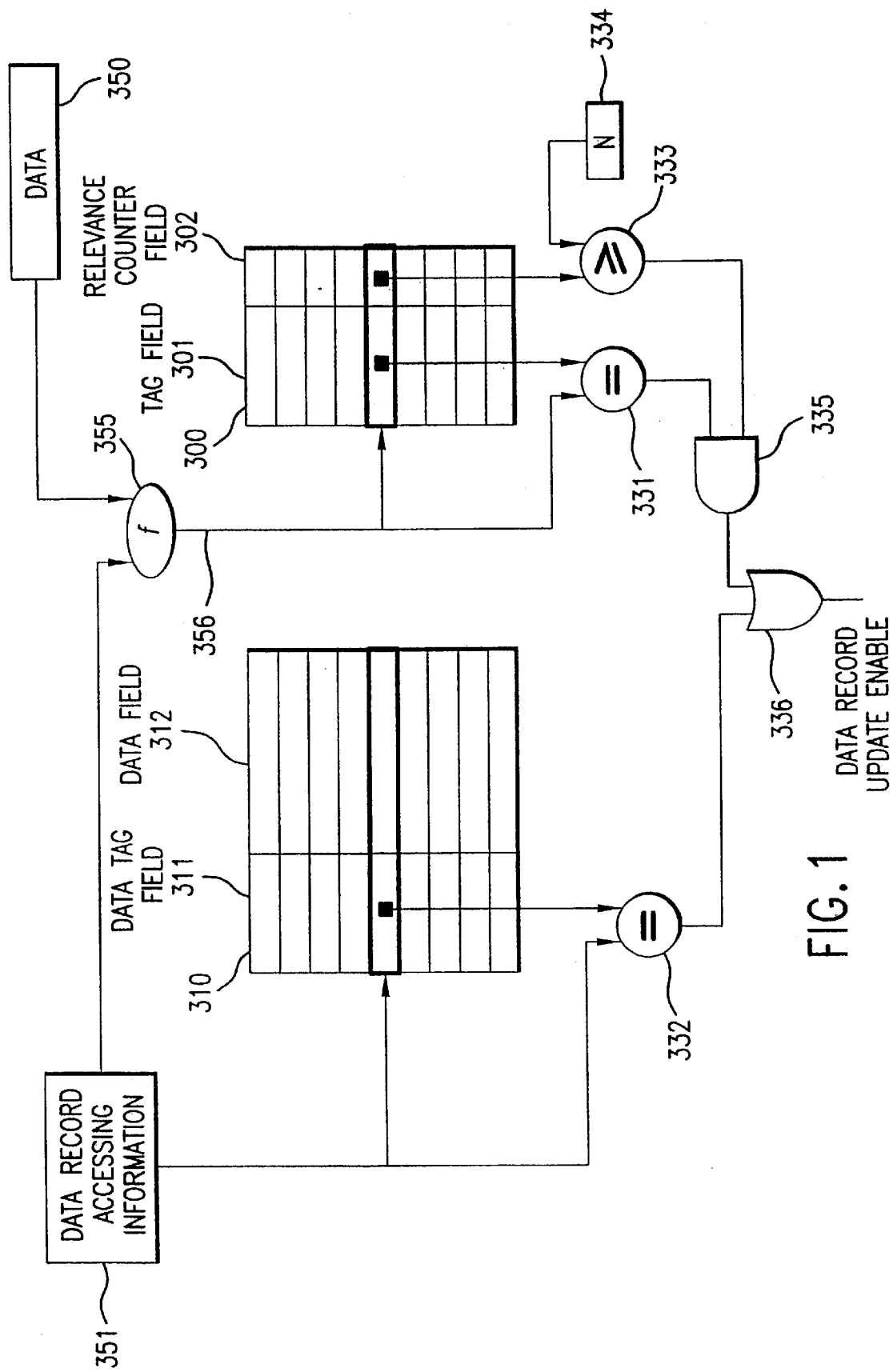
FIG. 1 shows an apparatus in accordance with an embodiment of the present invention.

FIG. 1 shows an apparatus in accordance with an embodiment of the present invention. A microprocessor can include data record 310 and filter record 300. Each of data record 310 and filter record 300 can be implemented in a table memory, e.g., a table memory in a cache, a table memory in a memory, etc. Data record 310 and filter record 300 can have various sizes and be of varied types, including direct-mapped, fully-associative, tag-less, etc. Data record 310 can be populated by a plurality of data entries, each data entry including a data tag stored in a data tag field 311 and a data value stored in a data field 312. In another embodiment of the present invention, each data entry includes a plurality of data fields to store a plurality of data values (e.g., a first data field to store a first data value, a second data field to store a second data value, etc.) The data record 310 can be indexed and tagged based on data record accessing information 351. For example, data record 310 can be indexed according to the LSBs (least significant bits) of at least a portion of the data record accessing information 351, and the data tags can consist of the MSBs (most significant bits) of at least a portion of the data record accessing information 351.

Filter record 300 can be populated with a plurality of filter entries, each filter entry including a filter tag stored in a tag field 301 and a relevance counter value stored in a relevance counter field 302. Filter record 300 can be indexed and tagged based on filter record accessing information 356. For example, filter record 300 can be indexed according to the LSBs (least significant bits) of at least a portion of the filter record accessing information 356, and the filter tags can consist of the MSBs (most significant bits) of at least a portion of the filter record accessing information 356. In another embodiment of the present invention, each filter entry includes a filter tag stored in a tag field, but a relevance counter value is not stored.

In one embodiment, filter record accessing information 356 is generated by selection circuit 355 based on a received data value (e.g., data 350) and the data record accessing information 351. Selection circuit 355 can generate the filter record accessing information by implementing a pre-defined function, such as data compression, selection of certain bits of the received data value and/or the data record accessing information, condensing data and select certain bits, extracting and XORing certain bits, etc.). In one embodiment, the filter record accessing information can be generated based on data record accessing information and a data value. Examples of a data record accessing information and a data value include at least a portion of a branch instruction address and a branch target address, at least a portion of a memory address and a data value, etc. In one embodiment, the data record accessing information and/or a data value can be condensed via a predetermined function into filter record accessing information including a few bits. This can result in an N-to-1 transformation of data values such that (1) a data value has one representation, and (2) a plurality of data values have the same representation. The filter record accessing information can be stored in a filter record, and can be dispatched between an index and a tag.

First comparator 331 can perform a filter tag comparison based on the filter record accessing information 356 output by selection circuit 355 and the tag and indexing information stored in filter record 300. Based on the filter tag comparison, comparator 331 can output a filter record hit/miss indication (e.g., a signal having a first state when there is a filter record hit and a second state when there is a filter record miss, etc.) Whether or not there is a filter record hit/miss, the filter record can be updated based on the generated filter record accessing information. In one embodiment, when there is a filter record hit, comparator 331 outputs a logical one as a filter record hit indication.

In an embodiment of the present invention, a filter record hit does not enable updating of the data record 310 unless a relevance counter value stored in the relevance counter field 310 of the hit filter entry is equal to or above a certain relevance threshold value. In one embodiment, the relevance counter value stored in the relevance counter field 310 of a filter entry embodies a saturating counter, and the relevance counter value is set to zero the first time a filter entry (e.g., including data index and data tag information) is stored in the filter record 300. Each time a filter record hit occurs with respect to a new received data, the relevance counter value stored in the relevance counter field 302 of the hit filter entry can be incremented and output to third comparator 333. When a received relevance counter value of a hit filter entry is equal to or greater than a relevance threshold value N 334, third comparator 333 can output a relevance indication (e.g., a logical one when the relevance counter value is equal to or above a relevance threshold value, a logical zero when the relevance counter value is below a relevance threshold, etc.).

In one embodiment, a filter hit/relevance update indication can be generated by AND 335 based on the filter record hit/miss indication received from first comparator 331 and the relevance indication received from third comparator 333. In one embodiment, a data record update is enabled when (1) there is a filter record hit, and (2) the received relevance counter value from the hit filter entry is above the relevance threshold value. In an embodiment in accordance with FIG. 1, when either there is a filter record miss or the relevance counter value of a hit filter entry is below the relevance threshold, a data record update is not enabled based on the status of the filter record 300.

The data record 310 can be updated by received data 350 when there is a data record hit. OR 336 can receive a data record hit indication from comparator 332 and generate a data record update enable indication to update the data record 310 based on the received data 350. Thus, in one embodiment, the data record 310 can be updated based on (1) a hit in data record 310 or (2) a hit in filter record 300 when the relevance counter value of the hit filter entry is equal to or above a certain relevance threshold.

Whether or not there is a filter record hit, the filter record 300 can be updated with filter record accessing information generated based on the data 350 and the data record accessing information 351. Updating the filter record 300 with the filter record accessing information can indicate that there was a prior attempt—successful or unsuccessful—to write data value 350 to data record 310. Rewriting the filter record accessing information to filter record 300 when there is a filter record hit can update the temporal property of filter record accessing information stored in the filter record 300 (e.g., how recently the filter record accessing information was used).

Allowing the update of data record 310 with data value 350 when there is a filter record hit, enables the updating of data record 310 with data values that exhibit a certain amount of temporal locality. For example, in one embodiment, when a data value 350 is not stored in data record 310 and there is a filter record miss, then the data record 310 is not updated with the data value 350 because the data value 350 may be an irregular data value, one that is written infrequently to the data record, etc. A memory record update filter can prevent blind updating and trashing of a data record with irrelevant data. Embodiments of the present invention, by filtering memory record updates, can maintain relevant information in a data record for a longer period of time.

In an embodiment in accordance with FIG. 1, when a data value 350 is not stored in data record 310, but there is a filter record hit, then the data record 310 is updated with the data value 350 because there had been a prior, relatively recent attempt to update the data record 310 with the data value 350. Such a prior, relatively recent attempt to update the data record 310 with the data value 350 can indicate that the data value 350 is not an irregular data value, is not an irrelevant data value, etc.

Allowing the update of data record 310 with data value 350 when there is a data record hit based on data record accessing information 351 enables the temporal updating of data record 310 even when the filter record accessing information corresponding to data value 350 is no longer stored in the filter record 300. Data value 350 can be stored in data record 310 and have its corresponding filter record accessing information evicted from the filter record 300 by a stream of filter record accessing information of irregular data values, even when none of the irregular data values are allowed to update the data record 310. Allowing the update of data record 310 based on a data record hit can maintain a regular data value within the data record despite eviction of the regular data value's filter record accessing information from the filter record 300.

Figure 2:
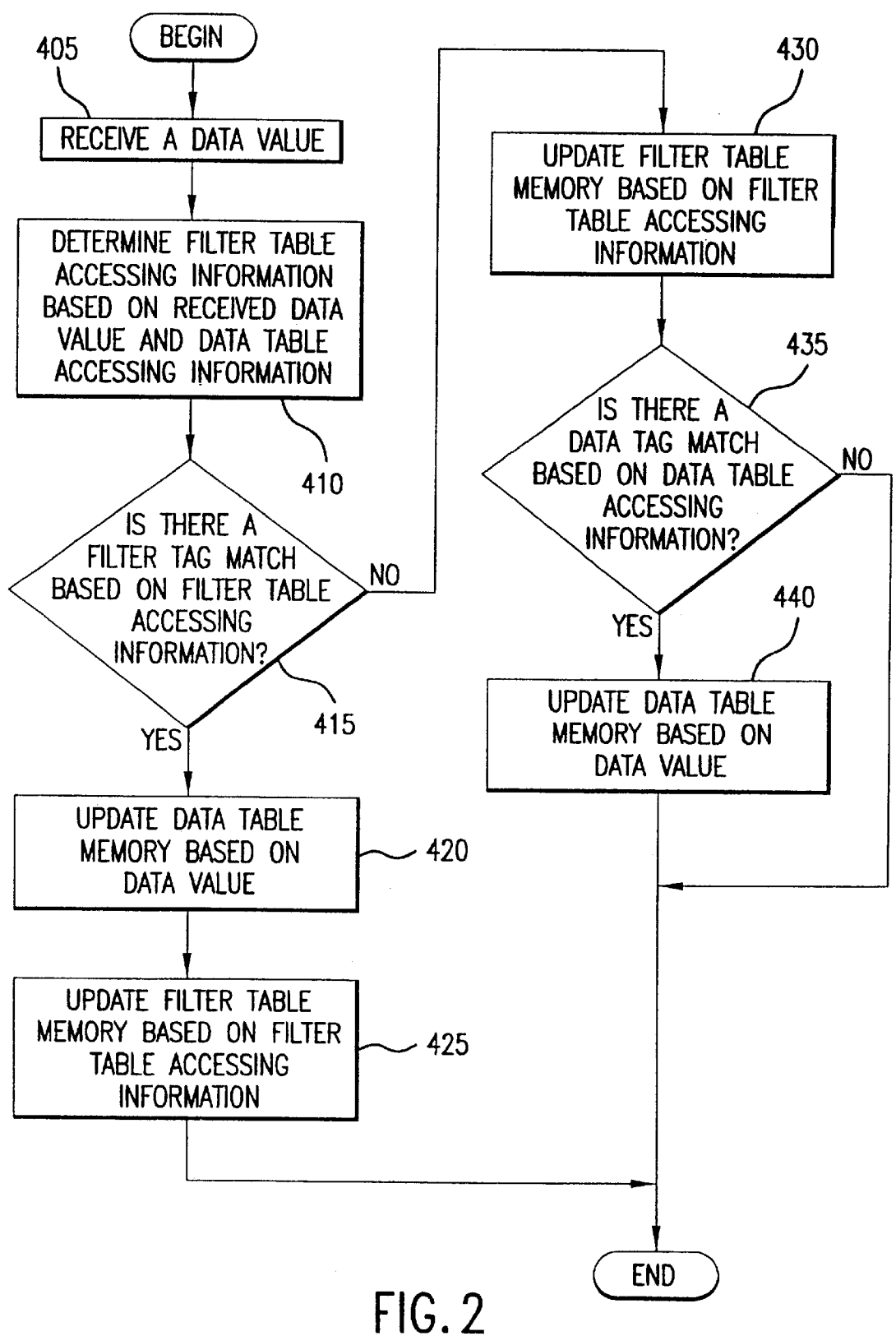
FIG. 2 illustrates a method in accordance with an embodiment of the present invention.

FIG. 2 illustrates a method in accordance with an embodiment of the present invention. An embodiment in accordance with a method can include a data table memory and a filter table memory. A data value can be received (box 405). Filter table accessing information can be determined based on the received data value and data table accessing information (box 410). Whether there is a filter tag match based on the filter table accessing information and filter tags stored in the filter table memory can be determined (box 415). When there is a filter tag match, the data table memory can be updated based on the data value (box 420) and the filter table memory can be updated based on the filter table accessing information (box 425).

When there is not a filter tag match, the filter table accessing information is not stored in the filter table memory, and the filter table memory can be updated based on the filter table accessing information (box 430). Whether there is a data tag match based on the data table accessing information and data tags stored in the data table memory can be determined (box 435). When there is a data tag match, the data table memory can be updated based on the data value (box 440). When there is not a data tag match (and the filter table accessing information is not stored in the filter table memory), the data table memory is not updated.

Embodiments of the present invention can filter memory record updates, including filtering updates to caches, filtering updates to predictors, etc. Other embodiments of the present invention can filter constant predictors, such as event predictors, value predictors, memory address predictors, branch predictors, predictors that predict the same type of value each time, etc. In one embodiment, stride filtering can encompass recording of a partial stride value, and the compared value is the last value updated by the stride value.

In another embodiment of the present invention, a branch address buffer can be populated with a plurality of buffer entries. Each buffer entry can include an instruction pointer (IP) tag field, a branch address field, and a filter bits field. The branch address buffer can be part of an apparatus to perform address prediction based on instruction pointers of branch instructions, and can be implemented in a table memory, e.g., a table memory in a cache, a table memory in a memory, etc. When an update of the branch address buffer is attempted based on an instruction pointer and branch address, the updating can be based in part on the status of the filter bits stored in the filter bits field of a buffer entry.

The filter bits stored in the filter bits field of a buffer entry can store a subset of the branch address last attempted to be written to a buffer entry (e.g., usually store the least significant bits of the address). When an update of the branch address buffer is attempted based on the instruction pointer and the branch address, an update can occur when an update enable indication is generated based on (1) a hit indication based on a tag match between the instruction pointer and an IP tag stored in an IP tag field of a buffer entry, and (2) a filter hit indication output based on a tag match between a subset of the branch address and a set of filter bits stored in the filter bits field of the IP hit buffer entry. A selection circuit can perform a function on the branch address to select and/or generate certain bits as the filter bits (e.g., select the four LSBs, implement a predefined function to condense a branch address, extracting and XORing certain bits, etc.) The filter bits field of an IP tag hit buffer entry can be updated on each attempt to update the branch address buffer. Thus, in one embodiment, an address associated with an instruction pointer is not used to update a buffer entry identified by the instruction pointer unless the address was associated with the instruction pointer on the previous—successful or unsuccessful—address buffer update. In a further embodiment, the filtering can be done at a lower granularity than the address buffer level (e.g., doing the filtering at the word level as opposed to at the cache line level in a data cache) to avoid eviction of relevant buffer entries due to spatial locality.

In one embodiment, a data record can be a branch target buffer (BTB) that can filter data record updates so that only branches that exhibit a certain level of temporal locality and without multiple targets are recorded. In such an embodiment, the filtered data can include a full branch instruction pointer (IP) and the full target address (e.g., 64 bits), and a filter record can be accessed (e.g., indexed, tagged, etc.) with bits from both the branch IP and the target address. In one embodiment, the filtering record is accessed by indexing information including 12 bits: concatenation of the 6 LSBs of the branch IP and the 6 LSBs of the target address. In one embodiment, a 256-entry direct-mapped cache with 4 bit tags can be used when the indexing information includes 12-bits. The indexing information can be dispatched between index and tag to maximize filtering performance.

In accordance with one embodiment of the present invention, instructions adapted to be executed by a processor to perform a method are stored on a computer-readable medium. The computer-readable medium can be a device that stores digital information. For example, a computer-readable medium includes a ROM as is known in the art for storing software (e.g., microcode). The computer-readable medium can be accessed by a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

Embodiments of apparatus and methods to filter memory record updates have been described. In the foregoing description, for purposes of explanation, numerous specific details have been set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention. Thus, while apparatus and methods in accordance with embodiments of the present invention have been described with reference to specific exemplary embodiments, the present specification and figures are to be regarded as illustrative rather than restrictive.

What is claimed is:

1. A filtered memory comprising:
   first means for storing;
   second means for storing;
   first means for comparing a data tag field from said first means for storing and a data record accessing information input;
   second means for comparing a filter tag field from said second means for storing and a data value input: and
   means for enabling said filter memory to store said data value input coupled to said first means for comparing and said second means for comparing.

2. The filtered memory of claim 1 further comprising:
   means for selecting between said data value input and said data accessing information input.

3. The filtered memory of claim 2 wherein said means for selecting comprises:
   means for outputting coupled to said second means for storing and said second means for comparing.

4. The filtered memory of claim 1 wherein each filter tag field comprises:
   means for storing a relevance counter value.

5. The filtered memory of claim 4 further comprising:
   third means for comparing said relevance counter field and a relevance threshold value input.

6. The filtered memory of claim 5 wherein said third means for comparing is coupled to said means for enabling.

7. The filtered memory of claim 6 wherein said third means for comparing comprises:
   means for outputting coupled to said means for enabling.

8. The filtered memory of claim 1 wherein said means for enabling comprises:
   third means for comparing;
   an AND gate coupled to said second means for comparing and said third means for comparing; and
   an OR gate coupled to said AND gate and said first means for comparing;
   said means for enabling to control the output of a data record update enable signal.

9. The filtered memory of claim 1 wherein said first means for storing and said second means for storing are each populated with a plurality of data entries.

10. The filtered memory of claim 9 wherein each of said plurality of data entries is to store a predicted value.

11. The filtered memory of claim 9 wherein each of said plurality of data entries is to store a branch target address; and
    the data accessing information input is to receive at least a portion of a branch instruction address.

12. The filtered memory of claim 9 wherein each of said plurality of data entries is to store a memory operation address; and
    the data accessing information input is to receive at least a portion of an instruction address.

13. The filtered memory of claim 9 wherein each of said plurality of data entries comprises:
    said relevance counter field.

14. A filtered memory comprising:
    means for providing a plurality of first entries having at least a tag field;
    means for comparing coupled to said tag fields of said means for providing the plurality of first entries and having an input for address data; and
    means for providing a plurality of second entries having a field to store data;
    each of said plurality of second entries field to store data, upon a hit in the plurality of first entries.

15. The filtered memory of claim 14 further comprising:
    means for selecting between said data value input and said data accessing information input.

16. The filtered memory of claim 14 wherein said means for selecting comprises:
    means for outputting coupled to said second means for storing and said second means for comparing.

17. The filtered memory of claim 14 wherein each of said plurality of first entries tag fields has an associated relevance counter field to store a relevance counter value.

18. A machine-readable medium having stored thereon a plurality of executable instructions to perform a method comprising:
    determining whether there has been a prior attempt to store a data item in a memory, during an attempt to store the data item in the memory; and
    storing the data item in the memory during the attempt to store the data item in the memory, if there have been a threshold number of prior attempts to store the data item in the memory.

19. The machine-readable medium of claim 18 wherein the threshold number is one.

20. The machine-readable medium of claim 18 wherein storing the data item in the memory comprises:
    storing the data item in the memory, if there has been one prior attempt to store the data item in the memory.

21. The machine-readable medium of claim 20 further comprises:
    storing a data item in a second memory section, if it is determined that there has been a prior attempt to store the data item.

22. The machine-readable medium of claim 18 wherein said determining comprises:
    reading from a first memory section a count value of prior attempts to store the data item.

23. The machine-readable medium of claim 22 further comprising:

allocating an entry in the first memory section for the data item, if there is no count value stored in the first memory section.

24. The machine-readable medium of claim 18 wherein said storing comprises:

storing the data item in a second memory section.

* * * * *